United States Patent [19]
Hildebolt

[11] 4,128,051
[45] Dec. 5, 1978

[54] PROTEIN TEXTURIZATION BY EXTRUSION WITH INTERNAL STEAM INJECTION

[75] Inventor: William M. Hildebolt, Mickleton, N.J.

[73] Assignee: Campbell Soup Company, Camden, N.J.

[21] Appl. No.: 797,420

[22] Filed: May 16, 1977

Related U.S. Application Data

[62] Division of Ser. No. 645,614, Dec. 31, 1975, Pat. No. 4,039,691.

[51] Int. Cl.² .............................................. A23P 1/00
[52] U.S. Cl. ....................................... 99/348; 99/483; 99/516; 425/326.1
[58] Field of Search ........................... 99/348, 352–355, 99/450.1, 483, 516, 534, 536; 426/507, 511, 656, 802; 425/4, 6, 7, 72 R, 308, 310, 324.1, 326.1, 381; 264/202; 366/79; 168

[56] References Cited
U.S. PATENT DOCUMENTS

| | | | |
|---|---|---|---|
| 3,642,490 | 2/1972 | Hawley | 426/511 |
| 3,778,522 | 12/1973 | Strommer | 426/511 |
| 3,954,360 | 5/1976 | Skilling | 425/326.1 |

Primary Examiner—Harvey C. Hornsby
Assistant Examiner—A. Henderson
Attorney, Agent, or Firm—Schuyler, Birch, Swindler, McKie & Beckett

[57] ABSTRACT

A bland protein product having a texture and mouth feel simulating animal meat is prepared by forming a dough-like mixture of protein material and water, and extruding a continuous tubular shell of the protein dough, while simultaneously injecting steam into the interior of the tubular shell, whereby the tubular shell of protein is blown into discrete pieces of irregularly shaped protein material by the steam flow. The steam flow then propels the protein pieces into and through a confined treating zone in which further texturization is accomplished. Finally, the protein material is passed through a back pressure maintaining means and recovered in usable form. Apparatus for performing this process comprises an extrusion assembly consisting of a screw feed chamber communicating with an extrusion die assembly which produces a continuous tubular shell of extrudate. The extrusion die is provided with means for injecting steam into the interior of the tubular shell of extrudate formed. Communicating with the extrusion assembly is a confined treating zone containing a back pressure maintaining means at its discharge end.

5 Claims, 1 Drawing Figure

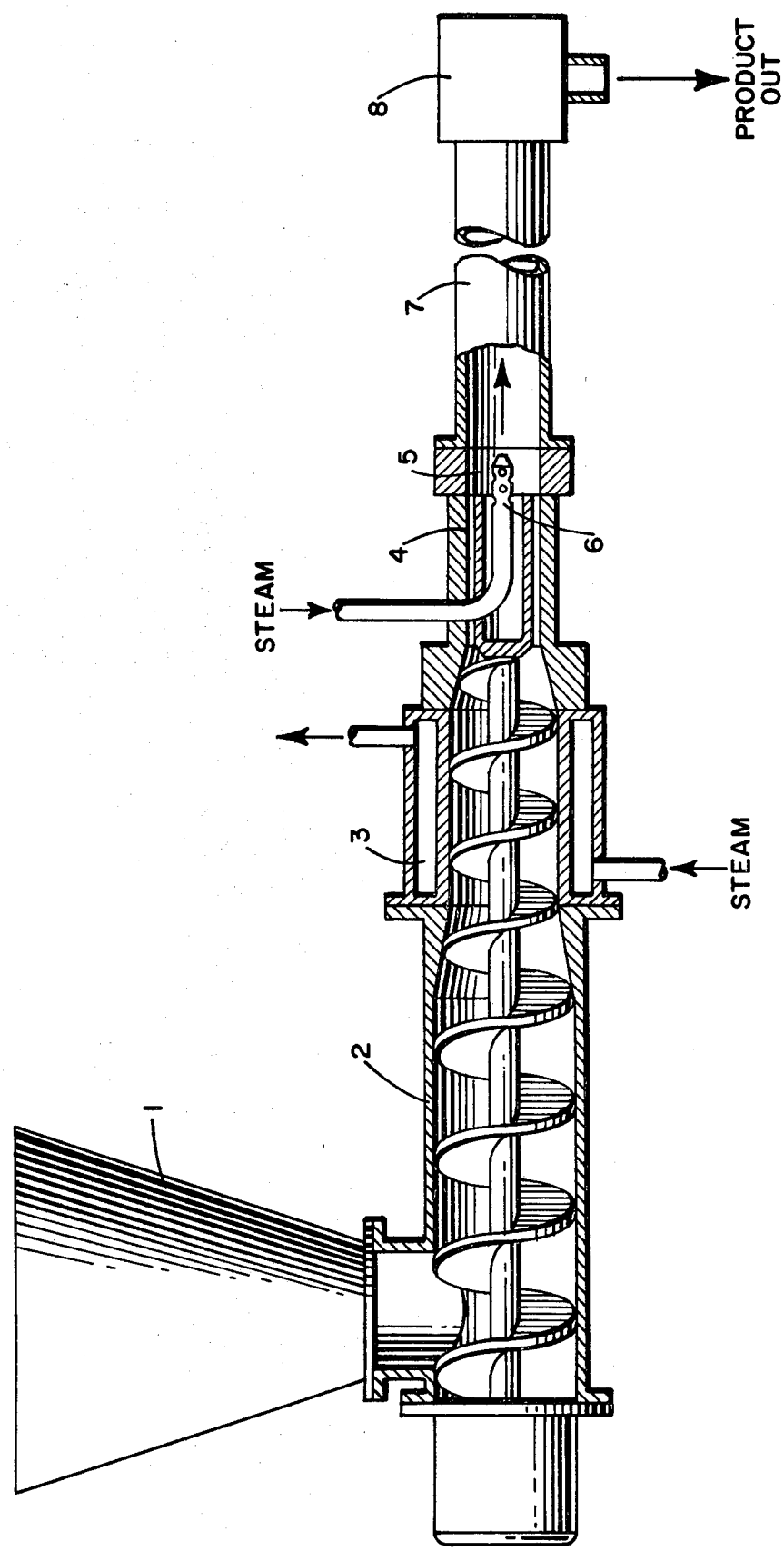

PROTEIN TEXTURIZATION BY EXTRUSION WITH INTERNAL STEAM INJECTION

This is a division, of application Ser. No. 645,614, filed Dec. 31, 1975, now U.S. Pat. No. 4,039,691.

BACKGROUND OF THE INVENTION

1. Field of the Invention

This invention relates to the treatment of untextured protein materials to form a product possessing the fibrous texture and mouth feel properties of animal meat.

2. Description of the Prior Art

The food industry has spent much effort over a span of many years and has expended large sums of money in an attempt to utilize non-meat proteins, such as those derived from vegetables, as additives to or substitutes for animal meat products. It long has been recognized that the ever-increasing worldwide food shortage could be in material part obviated if only such relatively inexpensive materials could be converted into products so closely approximating the naturally occurring food material that public acceptance would be achieved. One of the major roadblocks encountered by the industry has been the inability to impart the natural and accustomed chewy, fibrous texture to vegetable protein materials. Animal meat products inherently possess a texture giving them a definite "mouth feel" which is clearly recognized and strongly preferred. Vegetable proteins in their natural state generally take the form of amorphous powders which, despite their unquestioned nutritive value, possess mouth feel characteristics wholly unacceptable to the consumer as a meat substitute. Moreover, vegetable proteins normally are characterized by objectionable "beany" flavors which the industry has been unable to remove or mask.

In recent years a number of processes and apparatus have been developed for treating vegetable protein material to produce a bland texturized product. None of these processes, however, has achieved any substantive measure of commercial success.

The first generation of these prior art techniques involved the wet spinning process disclosed in Boyer, U.S. Pat. No. 2,730,447. This process produces a fibrous product by extruding a plurality of fine streams of an aqueous solution of protein into a chemical coagulating bath. The protein coagulates into fine fibers which are collected together and treated to form an edible textured protein product. The wet spinning process suffers from a number of drawbacks in addition to its general failure to produce an adequately textured product as discussed above. The equipment employed to perform this process is extremely sophisticated for the food industry and represents a very high initial cost problem. Adding further to the economic infeasibility of the product produced by the wet spinning process is the expensive starting materials which must be employed. Moreover, product uniformity is difficult to achieve due to the general complexity of the process and the numerous parameter control problems presented.

The second generation technique advanced in this area is the extrusion cooking process disclosed in Atkinson, U.S. Pat. No. 3,488,770, in which a protein mass is subjected to severe physical working at an elevated temperature and thereafter extruded at an elevated temperature and pressure through an orifice into a medium of lower pressure and temperature. This process also suffers from high equipment costs. Moreover, the product contains objectionable flavor notes in addition to the "beany" flavor originally present in the starting materials which are apparently imparted to the product by the processing steps. Other patents demonstrating the current state of the art in respect to the extrusion texturizing approach include Hale, U.S. Pat. Nos. 3,447,929; Jenkins, 3,496,858; Anker, 3,684,522; Strommer, 3,778,522; Lang, 3,800,053; Atkinson, 3,812,267; and Yang, 3,814,823.

The third generation of development in the protein texturization involves the use of steam as the texturizing medium. Exemplary of this approach are Strommer, U.S. 3,754,926 and 3,863,019 which treat either finely divided protein particles or slurries with steam and Heusdens U.S. Re. 28,091 which employs a steam treatment of a protein slurry following complex hydration steps. Products produced by these processes also possess the general problems of poor texture and flavor discussed above. The product is also extremely friable.

Other attempted solutions by the art include the cooking and shaping of a protein dough disclosed in McAnelly, U.S. Pat. No. 3,142,571, and the heat coagulation of undenatured protein disclosed in Rusoff, U.S. Pat. No. Re. 27,790.

Notwithstanding the veritable plethora of prior art attempts to satisfactorily texturize vegetable proteins — no one to date has made any really substantial progress toward the desired goal. The present absence from the market of any commercially accepted consumer products based on vegetable protein demonstrates clearly that the problems involved simply have not been solved. Indeed, those meat analog products which have found their way to the supermarket shelves generally have been met with little or no consumer acceptance and have generally been withdrawn. Especially in the United States, where consumer preferences rather than nutritional values often dictate the fate of food products, a successful texturized vegetable protein material simply must possess taste and mouth feel characteristics similar to natural meat. In addition, the prior art processes generally have employed such complex apparatus and procedures that initial equipment and operating costs have made protein analog products economically unattractive to manufacturers, despite the relatively inexpensive nature of the raw product.

Given the ever-increasing fears of worldwide famine and the diminishing availability of animal meat protein products, it is clear that an inexpensive, consumer-acceptable, high protein food product based on texturized vegetable proteins is urgently needed.

BRIEF SUMMARY OF THE INVENTION

It is the object of the present invention to provide a process and apparatus for texturizing protein which fulfills the need left by the prior art texturizing processes.

More specifically, it is an object of the present invention to provide a process and apparatus for producing discrete pieces of puffy irregularly shaped protein material having a random fibrous texture simulating that of natural meat.

It is a further object of the present invention to provide a process and apparatus which will produce a bland flavored protein product.

Another object of the present invention is to provide a process and apparatus which will produce a retort stable protein product.

It is also an object of this invention to provide a texturizing process and apparatus which will produce such a product at a much lower cost due to lower initial equipment costs and lower energy requirements.

It is also an object of the present invention to provide a high quality texturized protein product from relatively inexpensive, low protein starting materials.

Accordingly, the method of the present invention comprises continuously extruding a tubular shell of semi-rigid protein material into a confined treatment zone; injecting a heated gaseous stream into the interior of said tubular shell as it enters the confined treatment zone to blow the tubular shell into discrete pieces of irregularly shaped protein material; and recovering the texturized protein product.

The present invention further provides apparatus for texturizing protein which comprises means for continuously extruding a tubular shell of semi-rigid protein dough material into a confined treating zone; means for injecting a heated gaseous stream into the interior of said extruded tubular shell as it enters said confined zone to blow said shell into discrete pieces of irregularly shaped protein material; and means for recovering said texturized protein material.

BRIEF SUMMARY OF THE DRAWING

The FIGURE is a schematic drawing of the protein texturizing apparatus of the present invention.

DETAILED DESCRIPTION OF THE INVENTION

The present invention is directed to a process and apparatus for texturizing protein material. The term texturizing as used herein and widely understood in the art refers to the process of changing globular amorphous particles of protein into fibrous continuous phase protein material with structural identify.

The term retort stable as used herein refers to a product which keeps its structural integrity after treatment at elevated temperature and pressure. In the typical retort processing test about 1 part texturized protein is mixed with 10 parts of a 1% salt solution and sealed in a can. The can then is placed in a retort and subjected to a temperature of 250° F. and a pressure of 15 psig for about 60 minutes. The ability of a retorted product to maintain its structural integrity and bite characteristics can be tested by placing the product between the thumb and forefinger and subjecting the product to shear forces. A retort stable product will not disintegrate with moderate finger pressure. A product with poor retort stability will feel mushy and will fall apart when subjected to moderate shear forces.

Protein material employed in the process of the present invention should contain at least about 40% protein on a dry weight basis. Of primary interest are vegetable protein materials derived from soybean. Soy proteins can take the form of soy flour, soy concentrate, soy isolate or mixtures thereof. The process of the present invention is especially well suited to texturizing low protein materials such as soy flour. Other oilseed materials such as peanut, cottonseed, and sesame seed may also be employed. Other known protein materials such as those derived from wheat, milk, egg, single cell or leaf proteins and the like may be texturized according to the process of the present invention. Protein material employed should be viable, i.e., have a PDI (Protein Dispersability index) in the range of from about 40 to about 90%.

Other protein sources suitable for the practice of the present invention include natural meat products. When texturizing meat proteins, the starting material employed should consist of a mixture of meat and a protein binder. Meat proteins may comprise meat scraps or pieces possessing poor textural qualities such as mechanically deboned chicken, beef, seafood, etc. or blends of the foregoing. Suitable protein binders include vegetable proteins such as soy protein or other known proteins such as those derived from wheat, yeast, milk, egg, etc. In general, mixtures containing up to about 80% comminuted meat may be texturized according to the process of the present invention.

In accordance with the preferred embodiment of the process of the present invention the protein material described above is first mixed with water to form a protein dough or paste containing from about 40 to about 60% solids. This pasty or dough-like mixture then is advanced by an extrusion device comprising an essentially unheated passive screw feeding means. In this feed zone the product may be preheated to a relatively low temperature in the range of about 110° to 170° F. which is below the temperature at which any substantial texturization will take place. The screw feed means should be of the low work type which serves mainly to advance the protein dough rather than subjecting it to severe physical working, and typically is operated below 100 RPM's and preferably at about 20 to 50 RPM's.

Protein dough from the screw feed extrusion chamber then is forced under pressure through a ring-shaped die which produces a continuous tubular shell of semi-rigid protein material. The term "tubular" as used throughout the specification and claims refers to shapes other than cylindrical tubes, such as square or triangular tubes. In the preferred embodiment, however, the tubular extrudate forms a right circular cylinder of protein dough. Extrusion pressures developed at the die in the range of about 1000 to about 1400 psi are suitable in the practice of the present invention.

The next step of the present invention comprises injecting a heated gaseous stream into the interior of the tubular shell as it enters a confined treating zone which communicates with the extrusion die.

The purpose of the internally injected gas stream is to stretch the tubular protein shell in the direction of the gas flow while simultaneously creating internal forces on the shell which result in it being blown into discrete pieces of irregularly shaped protein material. The gas flow serves the further purpose of imparting a random texturizing effect to the protein pieces as they are torn from the protein shell. Preferably, the injection pressure and protein material composition are chosen so that the protein shell retains its integrity for a short distance into the confined treating zone. In this manner the protein is held within the environment present in the confined zone for a period of time, up to a minute or more, before it breaks up and is carried out of the zone by the gas flow. This increased holding time in the confined zone greatly enhances the textural qualities of the product and allows a shorter confined zone to be employed.

In the preferred embodiment the gaseous medium is high pressure steam. Generally, any steam pressure high enough to blow apart the semi-rigid tubular protein shell may be employed. In practice it has been found that pressures of about 80 to 150 psi are suitable to accomplish this result. Best results are achieved when employing pressure in the range of from about 110 to about 120 psi.

Any manner of injection which results in an impinging flow of steam onto the inner surface of the tubular shell may be utilized. Preferably, the steam is injected coaxially into the tubular shell.

After the discrete pieces of texturizing protein break off from the semi-rigid shell, the gas stream serves to propel the pieces through a confined treating zone. In this confined treating zone the elevated temperature, pressure and turbulence of the gas flow serves to impart further texture to the protein pieces and to volatilize objectionable flavor compounds. Generally, temperatures in this confined treatment zone of up to about 350° F. are suitable to achieve texturization with best results achieved in the range of 310° to 350° F. Pressure in the confined treatment zone is regulated by a back pressure maintaining means at the discharge end of the confined zone. Back pressures of up to about 100 psi measured at the exit port, should be maintained in the zone. Preferably, the back pressure is kept in the range of 60 to 80 psi. After passing through the back pressure maintaining means the discrete protein particles can be recovered in any known manner.

One embodiment of the apparatus of the present invention now will be described by reference to the FIGURE. A mixture of protein to be texturized and water is formed in any suitable mixing means 1. The dough-like mixture from the mixing means is discharged directly into a screw feed extrusion chamber 2. The screw feed extrusion chamber may be unheated over most of its length and serves only to forward the dough to the extrusion die. As the protein dough nears the extrusion die some external heat may be applied by steam jackets 3 or the like.

Communicating with the screw feed extrusion chamber is a die assembly 4 which is effective to form a continuous tubular shell of semirigid protein dough. The die assembly of the preferred embodiment comprises two concentrically disposed cylindrical surfaces defining an extrusion orifice. The product produced by such a die assembly is a continuous tube of protein material. As indicated above, the preferred shape of the extrusion orifice defined by the die assembly is a right circular cylinder, although other shapes may be employed. The dimensions of the die assembly are not critical. Preferably, the orifice thickness (i.e., the distance between the two cylindrical surfaces of the die assembly) should be small enough to produce an extruded shell which can be blown apart by internal injection at reasonable steam pressures.

As the extruded protein shell leaves the die assembly, it passes into an area defining injection zone 5. In this zone, a heated gaseous stream is injected into the tubular protein shell. This preferably is accomplished by the use of a coaxial injection nozzle 6 which delivers high pressure steam to the inside of the shell.

Communicating with the injection zone is a confined treating zone 7 in which the protein material is subjected to the action of heat and pressure from the turbulent gas flow leaving the injection zone. Preferably, this confined treatment zone takes the form of an elongated tube or chamber. The dimensions of this tube are not critical. In practice tube lengths of about eight to ten feet generally provide suitable retention times although longer or shorter tubes may be employed satisfactorily.

At the discharge end of the confined treating zone is a back pressure maintaining means 8. This back pressure means can comprise, for example, a spring loaded valve, a rotary valve, or a rotary letdown pump. In general, any device which allows the product to exit the confined zone while maintaining a predetermined back pressure upstream may be employed. The product issuing from the back pressure valve may be subjected to recovery by any known means. Since the product is essentially dry, it is only necessary to forward the steam/protein mixture to a zone where the steam can be vented off.

The product produced by the process of the present invention comprises large irregularly shaped discrete pieces of protein material having structural and eating properties similar to animal meat products. This product has a fibrous structure which is generally random in orientation. This structure has a relatively low density and can be characterized as puffy. The protein matrix has a random distribution of voids. These voids serve as shear points which give way upon chewing to provide bite and mouth feel characteristics which simulate natural meat products. Furthermore, the product is free from objectionable flavor notes which in themselves often made prior art products unacceptable to humans. Another advantage achieved by the process and apparatus of the present invention lies in the retort stability of the product. The protein product formed in accordance with this invention may be retorted without thermal degradation of its physical or organoleptic properties.

Products produced by the process of the present invention find utility in a number of food processing fields. These texturized protein products may be cut into portions suitable for direct incorporation into canned or frozen foods. The texturized product may also be employed as a filler or extender in ground meat products. It is also possible to produce fabricated nutrients from the protein material produced according to the present invention.

The process of the present invention is also useful to provide upgraded or restructured natural meat products. Meat scraps or by-products with little or no food value (due to their poor structural characteristics) can be texturized according to the process of the present invention to provide chicken, crabmeat, etc. cubes with good texture and mouth feel.

The following specific examples are intended to illustrate more fully the nature of the present invention without acting as a limitation on its scope.

EXAMPLE 1

A textured protein material is produced in accordance with the process of the present invention as follows. Soy flour and water are mixed in a Hobart bowl mixer equipped with dough hooks to form a dough-like proteinaceous material having a solids content of 50%. The protein dough is fed to an extrusion texturizing apparatus as shown in the FIGURE.

The extruder is a tamale extruder originally designed to produce a filled shell tamale type product. This tamale extruder is modified by replacing the filling inlet mechanism with a ½ inch steam inlet line. The die employed is tubular in shape with a diameter of 2 inches. The steam inlet line is positioned concentrically inside the tubular die and the inlet line is provided with a plurality of holes for the steam to escape. The die communicates with a confined treating zone which is a 9 foot long tube having 1½ inches diameter. As the extruded semi-rigid protein tube leaves the die, it is contacted with the steam from the inlet line. The injected steam blows the protein shell into pieces and carries these pieces through the confined zone. At the discharge end of the confined zone is a spring loaded back pressure valve (Model #D60R THMP Triclover Triclamp). The back pressure in the confined zone is about 40 to 50 psi and the zone is maintained at a temperature of about 250° to 270° F. The resulting product consists of irregularly shaped pieces of protein material possessing good textured qualities.

EXAMPLE 2

In this example, a blend of 50% Promine R (a soy protein isolate having a protein content of about 95% and produced by Central Soya, Inc.) and 50% soy flour (protein content about 50%) is slurried with water to a solids content of 45% and texturized as in Example 1. The product exhibits a high degree of fiber development.

EXAMPLE 3

A textured protein material is produced as in Example 1 except that the spring loaded back pressure valve is replaced with a back pressure rotary pump (Model C-P6 by Creamery Package Company). In this example, the back pressure is maintained at about 70 psi and the temperature in the confined zone is about 320° F. A highly textured product is obtained from the recovery zone.

While certain specific embodiments of the invention have been described with particularity herein, it should be recognized that various modifications thereof will occur to those skilled in the art. Therefore, the scope of the invention is to be limited solely by the scope of the claims appended hereto.

I claim:

1. Apparatus for texturizing protein material comprising:
   (a) means for mixing a source of protein and water to form a protein dough;
   (b) means communicating with said means for mixing for advancing said dough without imparting excessive work to said dough;
   (c) means communicating with said means for advancing for extruding said dough in the form of continuous tubular shell of semi-rigid material;
   (d) means for blowing said protein shell into discrete pieces of irregularly shaped protein material, said means for blowing said shell into pieces comprising means for injecting a gaseous stream into the interior of said shell as said shell leaves said means for extruding;
   (e) means defining a confined treating zone communicating with said extrusion means whereby said injected gaseous stream propels said pieces into and through said confined zone;
   (f) back pressure maintaining means disposed at the discharge end of said confined zone, said back pressure maintaining means maintaining a predetermined back pressure to said confined zone; and
   (g) means communicating with said back pressure maintaining means for recovering said texturized protein material.

2. The apparatus of claim 1 wherein said advancing means comprises a low work screw feeder.

3. The apparatus of claim 1 wherein said means for extruding comprises die means defining a tubular shaped orifice.

4. The apparatus of claim 3 wherein said die means comprises two concentric cylindrical shaped surfaces defining a right circular cylindrical orifice.

5. The apparatus of claim 1 wherein said injection means comprises a nozzle coaxially disposed within said die means.

* * * * *